United States Patent
Jahnke et al.

(10) Patent No.: US 10,516,180 B2
(45) Date of Patent: Dec. 24, 2019

(54) CARBON DIOXIDE REMOVAL SYSTEM FOR ANODE EXHAUST OF A FUEL CELL

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 16/096,596

(22) PCT Filed: Apr. 26, 2017

(86) PCT No.: PCT/US2017/029667
§ 371 (c)(1),
(2) Date: Oct. 25, 2018

(87) PCT Pub. No.: WO2017/189744
PCT Pub. Date: Nov. 2, 2017

(65) Prior Publication Data
US 2019/0140296 A1 May 9, 2019

Related U.S. Application Data

(60) Provisional application No. 62/328,392, filed on Apr. 27, 2016.

(51) Int. Cl.
*B01F 3/04* (2006.01)
*B01D 47/00* (2006.01)
(Continued)

(52) U.S. Cl.
CPC ........ *H01M 8/0668* (2013.01); *B01D 47/022* (2013.01); *B01D 50/00* (2013.01);
(Continued)

(58) Field of Classification Search
CPC ........ B01F 3/04; B01D 47/00; B01D 47/022; B01D 50/00; B01D 53/14
(Continued)

(56) References Cited

U.S. PATENT DOCUMENTS 7,604,684 B2 * 10/2009 Menzel .............. B01D 53/1406
95/173
9,861,931 B2 * 1/2018 Kuopanportti ..... B01D 53/1425
(Continued)

FOREIGN PATENT DOCUMENTS

CN 104847424 A 8/2015
WO WO-2015/133757 A1 9/2015

OTHER PUBLICATIONS

International Search Report and Written Opinion dated Jul. 14, 2017 for PCT/US2017/029667 (7 pages).

*Primary Examiner* — Robert A Hopkins
(74) *Attorney, Agent, or Firm* — Foley & Lardner LLP

(57) ABSTRACT

A carbon dioxide removal system includes: an absorption system including a first absorption stage and a second absorption stage. The first absorption stage includes: a first compressor configured to receive and compress a first carbon dioxide-containing exhaust stream from an anode of a fuel cell, and a first direct contact absorption cooling tower configured to absorb carbon dioxide from the compressed first exhaust stream and lower a temperature of the compressed first exhaust stream using a first solvent stream containing a physical solvent, to generate a second exhaust stream. The second absorption stage includes: a second compressor configured to receive and compress the second exhaust stream from the first absorption stage, and a second direct contact absorption cooling tower configured to absorb carbon dioxide from the compressed second exhaust stream and lower a temperature of the compressed second exhaust (Continued)

stream using a second solvent stream containing a physical solvent.

18 Claims, 12 Drawing Sheets

(51) Int. Cl.
    *B01D 53/14*     (2006.01)
    *B01D 50/00*     (2006.01)
    *H01M 8/0668*     (2016.01)
    *B01D 47/02*     (2006.01)
    *C02F 1/06*     (2006.01)

(52) U.S. Cl.
    CPC ......... *B01D 53/14* (2013.01); *B01D 53/1406* (2013.01); *B01D 53/1475* (2013.01); *B01D 53/1493* (2013.01); *B01F 3/04* (2013.01); *C02F 1/06* (2013.01); *B01D 2252/2026* (2013.01); *B01D 2257/504* (2013.01)

(58) Field of Classification Search
    USPC .................................................. 96/234, 243
    See application file for complete search history.

(56) References Cited

U.S. PATENT DOCUMENTS

| | | |
|---|---|---|
| 2004/0229102 A1 | 11/2004 | Jahnke et al. |
| 2010/0279181 A1 | 11/2010 | Adams et al. |
| 2012/0167620 A1 | 7/2012 | Van Dorst et al. |
| 2015/0089951 A1 | 4/2015 | Barckholtz et al. |

\* cited by examiner

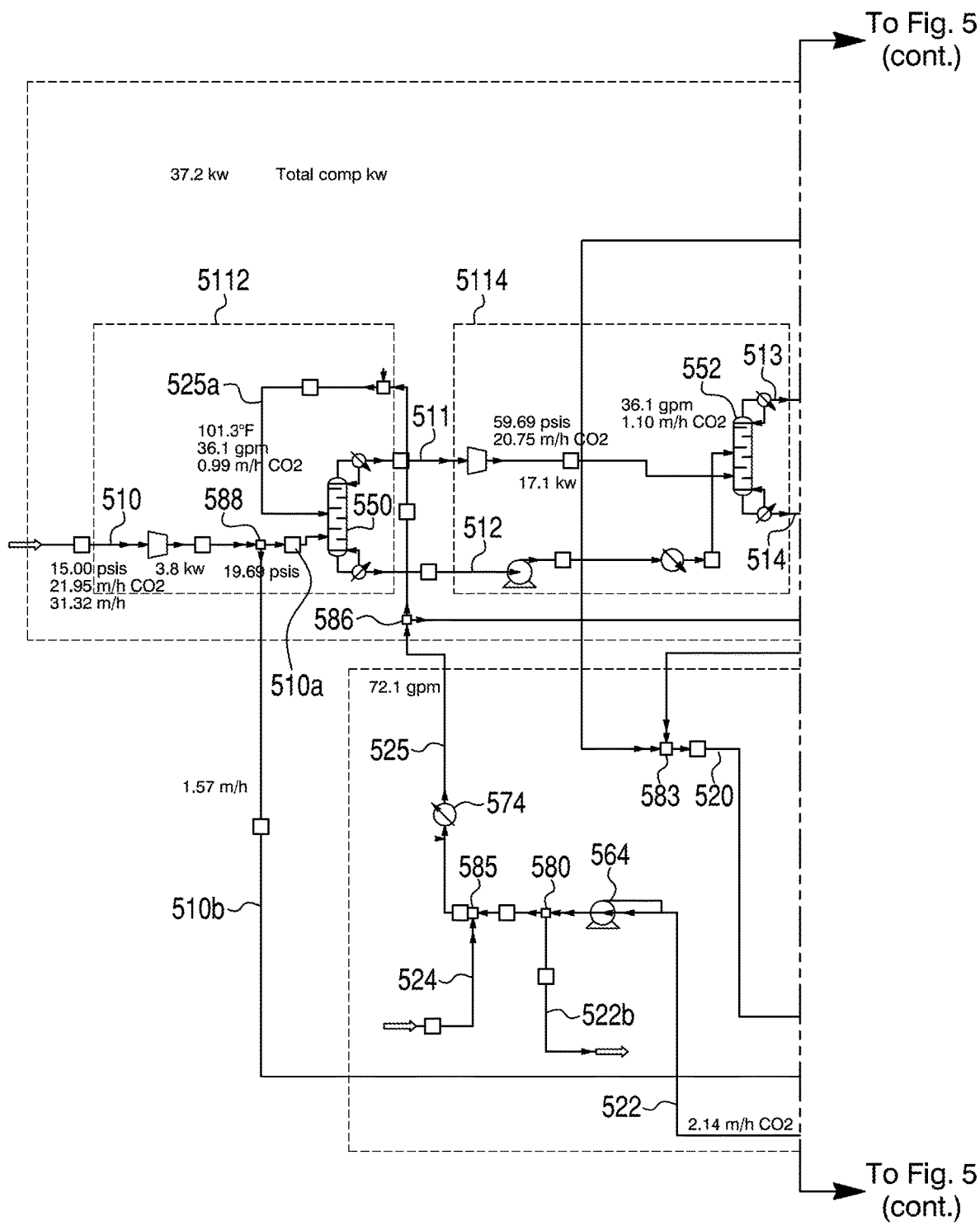

CARBON DIOXIDE REMOVAL SYSTEM FOR ANODE EXHAUST OF A FUEL CELL

CROSS-REFERENCE TO RELATED APPLICATIONS

The present application is a U.S. national stage entry of PCT/US2017/029667, filed on Apr. 26, 2017, which claims priority to U.S. Provisional Appl. No. 62/328,392, filed on Apr. 27, 2016, all of which are hereby incorporated by reference in their entireties.

FIELD

The present disclosure relates to fuel cells. In particular, the present disclosure relates systems for removing carbon dioxide from the anode exhaust of a fuel cell.

BACKGROUND

Fuel cells are devices that convert chemical energy stored in a fuel, such as a hydrocarbon fuel, into electrical energy by means of an electrical reaction. Generally, a fuel cell has an anode, a cathode, and an electrolyte layer that together drive chemical reactions that produce electricity. Exhaust, which may comprise a mixture of hydrogen, carbon monoxide, and carbon dioxide, is produced as a byproduct from the anode of the fuel cell. The anode exhaust contains useful byproduct gases such as hydrogen and carbon monoxide, which can be exported as syngas or hydrogen for other uses, such as fuel for the fuel cell or feed for other chemical reactions. For hydrogen production, the bulk of the carbon monoxide in the anode exhaust may be converted to hydrogen via a water gas shift reaction upstream of a carbon dioxide removal system. When the anode exhaust is not shifted, the anode exhaust gas of an MCFC (molten carbonate fuel cell) has a 2/1 $H_2/CO$ ratio, which is desirable for chemicals or fuels synthesis. However, to prepare the anode exhaust to be suitable for such uses, the bulk of the carbon dioxide present in the anode exhaust must be removed.

SUMMARY

One method of removing carbon dioxide from anode exhaust may be through the use of an acid gas removal solvent capable of absorbing, and thus separating, carbon dioxide from the exhaust stream. One such physical solvent is a polyethylene glycol dimethyl ether (PGDE) based solvent, which may be provided under the trade name Selexol™. PGDE based solvents are physical solvents, which, unlike amine-based acid gas removal solvents, do not chemically react with the acid gases contained in the exhaust stream in order to separate acid gases. This allows for a process that requires less energy to regenerate the solvent than processes using amine-based solvents.

To provide sufficient removal capacity for the Selexol™, the anode exhaust stream should be exposed to the Selexol™ at higher than atmospheric pressures. However, the exhaust stream typically exits the anode of the fuel cell at low pressures, near atmospheric pressure. To provide a higher pressure stream, the exhaust stream must be compressed. Continuous compression of the anode exhaust stream results in an increase in temperature of the exhaust stream, which makes it more difficult to compress further to higher pressures. Typically, compression occurs in stages with cooling of the compressed gas between stages.

The carbon dioxide removal system of the present disclosure compresses the anode exhaust stream in an absorption system having distinct stages. During each stage, the anode exhaust stream is first compressed and then exposed to Selexol™, which is provided at a cooler temperature. The contact allows the anode exhaust stream to be cooled and some of the carbon dioxide to be absorbed and removed before the anode exhaust stream is conveyed to a subsequent compression process and/or absorption process. This absorption of carbon dioxide at lower pressure allows for subsequent compression processes that can be performed at lower energy requirements. Once adequately pressurized, the anode exhaust stream may then go through the final absorption process where the exhaust is exposed to lean Selexol™ (i.e., highly pure Selexol™) having an optimized capacity to absorb the carbon dioxide remaining in the exhaust stream. This process produces a syngas having a reduced amount of carbon dioxide relative to the exhaust stream produced by the anode.

The carbon dioxide removal system of the present disclosure is also provided with a regeneration system. The regeneration system is configured to regenerate the carbon dioxide-rich Selexol™, desorbing the CO2 from the Selexol™, so that the solvent may be recycled back to the absorption system for continuous absorption processing. In some embodiments, the rich Selexol™ may be air-stripped using air that will later be provided to the anode gas oxidizer (AGO) or the cathode of the fuel cell. In other embodiments, the air stripped Selexol™ may also be stripped of oxygen that may later be desorbed into the syngas during the absorption processes. By stripping the rich Selexol™ of oxygen during the regeneration process, a syngas may be produced having minimized oxygen, allowing for the exportation of the syngas for uses that require low oxygen amounts. In yet other embodiments, the rich Selexol™ may be exposed to a lower pressure flash treatment to produce a flash stream of highly pure $CO_2$ and a lean Selexol™ free of oxygen. In yet other embodiments, the rich Selexol™ may be stripped at low pressure using a portion of the feed anode exhaust stream to produce an anode exhaust-$CO_2$ stream that can be provided to the AGO and a lean Selexol™ free of oxygen with lower $CO_2$ content than would result from simply flashing.

In one embodiment, a carbon dioxide removal system includes: an absorption system including a plurality of absorption stages, the plurality of absorption stages including a first absorption stage and a second absorption stage. The first absorption stage includes: a first compressor configured to receive a first carbon dioxide-containing exhaust stream from an anode of a fuel cell and to compress the first exhaust stream, and a first direct contact absorption cooling tower configured to absorb carbon dioxide from the compressed first exhaust stream, to lower a temperature of the compressed first exhaust stream using a first solvent stream containing a physical solvent, and to generate a second exhaust stream. The second absorption stage includes: a second compressor configured to receive the second exhaust stream from the first absorption stage and to compress the second exhaust stream, and a second direct contact absorption cooling tower configured to absorb carbon dioxide from the compressed second exhaust stream, to lower a temperature of the compressed second exhaust stream using a second solvent stream containing a physical solvent, and to generate a third exhaust stream.

In one aspect, the carbon dioxide removal system further includes a regeneration system configured to receive at least one solvent stream from at least one of the plurality of absorption stages and to output a lean solvent stream. In one aspect, the regeneration system is further configured to output a high-purity $CO_2$ stream.

In one aspect, the regeneration system includes a first flash tank configured to perform a flash treatment on the at least one solvent stream from said at least one of the plurality absorption stages and to generate a first lean solvent stream.

In one aspect, the regeneration system further includes a second flash tank configured to perform a flash treatment on the first lean solvent stream and to generate a second lean solvent stream.

In one aspect, the first solvent stream is at least a portion of the lean solvent stream output by the regeneration system.

In one aspect, the absorption system further includes a first pump configured to raise a pressure of a first solvent output stream received from the first direct contact absorption cooling tower, and a first heat exchanger configured to cool the pressurized first solvent output stream and to output the second exhaust stream to the second direct contact absorption cooling tower.

In one aspect, the plurality of absorption stages further include a third absorption stage. The third absorption stage includes: a third compressor configured to receive the third exhaust stream from the second absorption stage, and to compress the third exhaust stream, and a third direct contact absorption cooling tower configured to absorb carbon dioxide from the compressed third exhaust stream, to lower a temperature of the compressed third exhaust stream using a third solvent stream containing a physical solvent, and to generate a fourth exhaust stream. The absorption system further includes a second pump configured to raise a pressure of a second solvent output stream received from the second direct contact absorption cooling tower, and a second heat exchanger configured to cool the pressurized second solvent output stream and to output the third exhaust stream to the third direct contact absorption cooling tower.

In one aspect, the plurality of absorption stages further comprise a fourth absorption stage; the fourth absorption stage comprises a fourth direct contact absorption cooling tower configured to receive the fourth exhaust stream from the third absorption stage, to absorb carbon dioxide from the fourth exhaust stream and to lower a temperature of the fourth exhaust stream using a fourth solvent stream containing a physical solvent; the carbon dioxide removal system further comprises a regeneration system configured to receive a first input solvent stream from the third absorption stage and a second input solvent stream from the fourth absorption stage, and to output a lean solvent stream; and each of the first and fourth solvent streams is a portion of the lean solvent stream output by the regeneration system.

In one aspect, the plurality of absorption stages include a final absorption stage. The final absorption stage includes: a compressor configured to receive an exhaust stream from a previous absorption stage and to compress that exhaust stream, and an direct contact absorption cooling tower configured to absorb carbon dioxide from that compressed exhaust stream and to lower a temperature of that compressed exhaust stream using a solvent stream containing a physical solvent. The carbon dioxide removal system further includes a regeneration system configured to receive at least one solvent stream from at least one of the absorption stages and to output a lean solvent stream. The solvent stream used in the direct contact absorption cooling tower of the final absorption stage is a portion of the lean solvent stream output by the regeneration system. In one aspect, the regeneration system is further configured to output a high-purity $CO_2$ stream.

In one aspect, the carbon dioxide removal system further includes: a regeneration system including a first regeneration tower configured to receive at least one solvent stream from at least one of the plurality of absorption stages and to output a first lean solvent stream.

In one aspect, the regeneration system further includes a second regeneration tower configured to remove oxygen and nitrogen from the first lean solvent stream using a portion of the exhaust stream from an anode of the fuel cell, and to output a second lean solvent stream.

In one aspect, the carbon dioxide removal system further includes: a regeneration system including a regeneration tower configured to remove oxygen and nitrogen from the first lean solvent stream using a portion of the exhaust stream from an anode of the fuel cell, and output a second lean solvent stream.

In one aspect, the carbon dioxide removal system further includes the fuel cell including the anode. The fuel cell is a molten carbonate fuel cell.

In one aspect, the physical solvent is a polyethylene glycol dimethyl ether (PGDE) based solvent.

In one aspect, the PGDE based solvent is Selexol™.

These and other advantageous features will become apparent to those reviewing the disclosure and drawings.

DETAILED DESCRIPTION

Referring generally to the figures, disclosed herein is a carbon dioxide removal system that is capable of producing syngas or hydrogen from the exhaust stream produced by an anode of a fuel cell, such as a MCFC or other type of high temperature fuel cell. The produced syngas is suitable for other purposes, such as feed to drive other reactions (e.g., Fischer-Tropsch) or as fuel for a fuel cell.

First Embodiment

Figure 1:
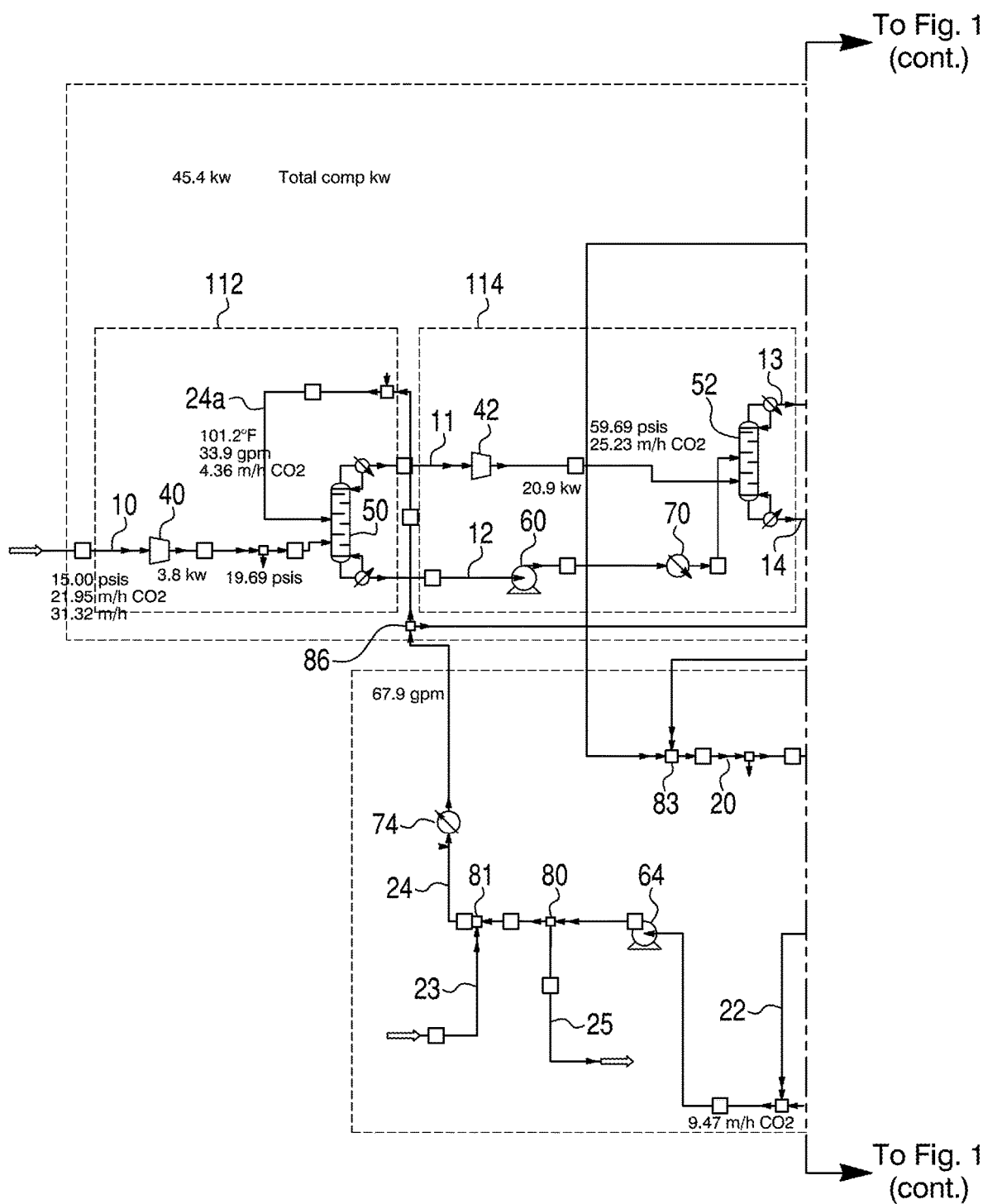
FIG. 1 shows a schematic view of a carbon dioxide removal system for a fuel cell, according to a first embodiment of the present invention, where the rich Selexol™ is flashed at a moderate pressure.
Figure 1:
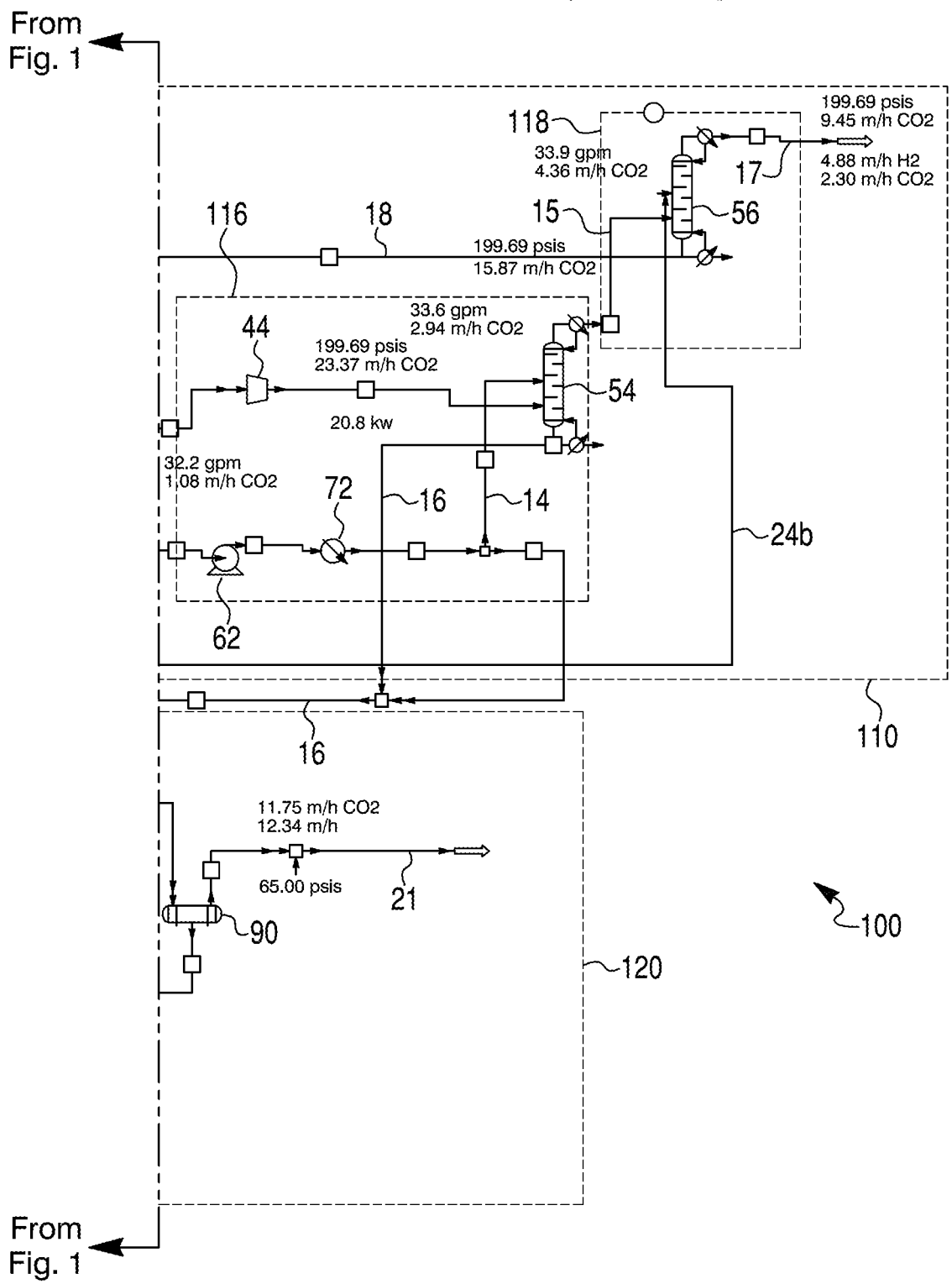

FIG. 1 schematically shows a system 100 for the removal of carbon dioxide from an anode exhaust stream of a fuel cell according to a first embodiment. As shown in FIG. 1, the system 100 generally includes an absorption system 110, which comprises two or more absorption stages, and a regeneration system 120.

The Absorption System 110

The carbon dioxide removal process begins by feeding the system 100 with a first exhaust stream 10 produced by the anode of a fuel cell. In the embodiment shown, the fuel cell is an MCFC, which produces an anode exhaust gas stream that primarily contains hydrogen, carbon dioxide, carbon monoxide, water and small amounts of methane and nitrogen. At this stage, the first exhaust stream 10 contains a high amount of carbon dioxide relative to the other gases (e.g., 70 mol %).

As shown in FIG. 1, the anode exhaust stream 10 is first introduced into a first absorption stage 112 of the absorption system 110, where the stream 10 is provided at a low pressure (e.g., about 15 psia). In the first stage 112, the anode exhaust stream 10 is fed into a first compressor/blower 40 that compresses the stream 10 to a slightly higher pressure (e.g., about 20 psia), which, in turn, increases the temperature of the stream 10 due to the compression process.

The compressed first exhaust stream 10 is then fed into a first direct contact absorption cooling tower 50, where a first solvent stream 24a produced from the regeneration system 120 is also introduced. The first solvent stream 24a is a stream containing lean Selexol™ (i.e., highly pure Selexol™). For example, when introduced into the first tower 50, the first solvent stream 24a primarily contains Selexol™ in a proportion of at least 80 mol % (preferably about 90 mol %) and small amounts of carbon dioxide and water. The first tower 50 is configured to operate as an absorber for the first solvent stream 24a. During this process, the first solvent stream 24a absorbs a very small amount of carbon dioxide contained in the first exhaust stream 10 due to the low pressure. The main function of the first absorber is to lower the temperature of the first exhaust stream 10 through heat exchange.

After the absorption process, the first exhaust stream 10 exits the first absorption cooling tower 50 as a second exhaust stream 11, which, relative to the first exhaust stream 10, contains a smaller proportion of carbon dioxide (e.g., a reduction of about 1 to 2 mol %) due to the absorption of the small amount of carbon dioxide by the first solvent stream 24a and is at lower temperature. As shown in FIG. 1, the second exhaust stream 11 then enters a second absorption stage 114, where the pressure of the stream is increased (e.g., to about 60 psia) by a second compressor 42 before being introduced into a second absorption cooling tower 52, which is also configured to operate as an absorber for the solvent stream.

At the same time, the first solvent stream 24a exits the first tower 50 as a second solvent stream 12, where the stream 12 is fed into a first pump 60 to increase its pressure and a first heat exchanger 70 to reduce its temperature before being fed into the second tower 52.

Like the first tower 50, the second tower 52 subjects the second exhaust stream 11 (now provided at a higher relative pressure than the first solvent stream 24a) and the second solvent stream 12 (now provided at a higher relative pressure than the first solvent stream 24a) to an absorption process during which the second solvent stream 12 absorbs additional carbon dioxide from the second exhaust stream 11 and cools the second exhaust stream 11. The second exhaust stream 11 exits the second tower 52 as a third exhaust stream 13 and enters a third absorption stage 116. Similarly, the second solvent stream 12 exits the second tower 52 as a third solvent stream 14 and enters the third absorption stage 116.

The third absorption stage 116 may be configured to operate in a similar manner as the second absorption stage 114. For example, the third exhaust stream 13 is fed into a third compressor 44 where the pressure of the third exhaust stream 13 is increased (e.g., to about 200 psia) before entering a third absorption cooling tower 54. In addition, the third solvent stream 14 is fed into a second pump 62 and a second heat exchanger 72 to increase its pressure before entering the third tower 54. After the absorption process in the third tower 54, the third exhaust stream 13 exits the third tower 54 as a fourth exhaust stream 15 and enters a fourth absorption stage 118. At the same time, the third solvent stream 14 exits the third tower 54 as a first input solvent stream 16 where it is conveyed to the regeneration system 120.

At the fourth absorption stage 118, the fourth exhaust stream 15 enters a fourth absorption cooling tower 56 to undergo a final absorption process using an output lean solvent stream 24b produced from the regeneration system 120, to absorb additional carbon dioxide from the fourth exhaust stream 15. At this point, because the fourth exhaust stream 15 is provided at a high enough pressure (e.g., about 200 psia), the output lean solvent stream 24b can more effectively absorb carbon dioxide present in the fourth exhaust stream 15. In addition, rather than using a solvent stream recycled from the previous absorption processes (e.g., the solvent stream that exits the third absorption cooling tower 54), the output lean solvent stream 24b is used, which has been effectively stripped of absorbed carbon dioxide from previous absorption processes, has an increased capacity to absorb the remaining carbon dioxide and minimize the amount of carbon dioxide in the fourth exhaust stream 15. In this embodiment, the fourth absorption stage 118 is a final absorption stage of the system. However, in other embodiments, more or fewer absorptions stages may be included in the system. Regardless of the number of absorption stages, it is preferably that the lean solvent stream 24b be used in the final absorption stage to minimize the amount of $CO_2$ which is not captured by the solvent.

The final absorption process results in an output exhaust stream 17 having low carbon dioxide relative to the first exhaust stream 10 produced by the fuel cell. For example, the output exhaust stream 17 may have carbon dioxide present may be present in a proportion of about 53 mol % relative to the other gases present in the stream. This reduction in concentration of carbon dioxide in the exhaust stream allows the output exhaust stream 17 to be suitably exported for other uses. For example, the output exhaust stream 17 may be exported as a syngas due to higher relative concentrations of hydrogen and carbon monoxide in the output exhaust stream 17 (e.g., in the embodiment shown in FIG. 1, the output exhaust stream 17 may contain hydrogen in a proportion of about 27 mol % and carbon monoxide in a proportion of about 13 mol % compared to the first exhaust stream 17 which contains hydrogen in a proportion of about 16 mol % and carbon monoxide in a proportion of about 8 mol %). In some embodiments, the syngas may be recycled back to the fuel cell as a fuel for the chemical reactions of power production. In other embodiments, because the output exhaust stream 17 is also pressurized to a sufficiently high pressure, the syngas may also be suitably used as feed for Fischer-Tropsch reactions. This configuration has a low carbon dioxide removal relative to the other configurations described below, but has a very simple solvent desorbing system and produces a medium pressure, high purity carbon dioxide stream 21.

The Regeneration System 120

As shown in FIG. 1, the output lean solvent stream 24b exits the fourth absorption cooling tower 56 as a second input solvent stream 18, where it is conveyed to the regeneration system 120. At the regeneration system 120, the first input solvent stream 16 and the second input solvent stream 18 are mixed together at a first mixer 83 to produce a mixed solvent stream 20 that is then introduced into a flash tank 90. The flash tank 90 is configured to receive the mixed solvent stream 20 and produce a flash stream in the form of a high-purity $CO_2$ stream 21 (e.g., a stream having carbon dioxide in a proportion of about 95 mol %). The $CO_2$ stream 21 may then be exported from the system 100 for other purposes, such as for storage or oil production needs.

The flash tank system works by lowering the pressure of the rich solvent. At lower pressures, the solvent is unable to absorb as much $CO_2$ as at high pressure and the excess $CO_2$ is flashed from the solvent as a gas. The $CO_2$ gas is then separated from the liquid solvent. Although not shown, the solvent could also be heated to reduce the amount of $CO_2$ it can absorb. Although heating the solvent requires energy, it would allow the production of additional medium pressure $CO_2$ and increase the amount of $CO_2$ removed from the anode gas.

The mixed solvent stream 20 exits the flash tank 90 as a lean solvent stream 22. At this point, some carbon dioxide (e.g., about 6 mol %) may be present in the lean solvent stream 22. To maintain the proper volume of solvent in the system, the lean solvent stream 22 may be pressurized with a third pump 64 and a portion 25 of the lean solvent stream 22 may be removed from the system 100 using a first divider 80 to prevent excess solvent in the system. A makeup solvent stream 23 may likewise be introduced into the lean solvent stream 22 using a second mixer 81 to produce an output solvent stream 24 to prevent insufficient solvent inventory.

When being introduced into the absorption system 110, the output solvent stream 24 is then cooled by a third heat exchanger 74 and split into two separate streams using a second divider 86, which includes the first solvent stream 24a, which is introduced into the first tower 50, and the output lean solvent stream 24b, which is introduced into the fourth tower 56.

Second Embodiment

In the first embodiment described above, the regeneration system 120 allows the $CO_2$-rich solvent to be regenerated by removing the carbon dioxide from the $CO_2$-rich solvent to produce a highly pure $CO_2$ gas stream that can be used for other purposes. In other embodiments, the regeneration system 120 may also be used to regenerate the solvent by removing the carbon dioxide present in the solvent stream to produce other useful byproducts or to reduce the $CO_2$ in the lean solvent, which will reduce the $CO_2$ in the syngas product.

Figure 2:
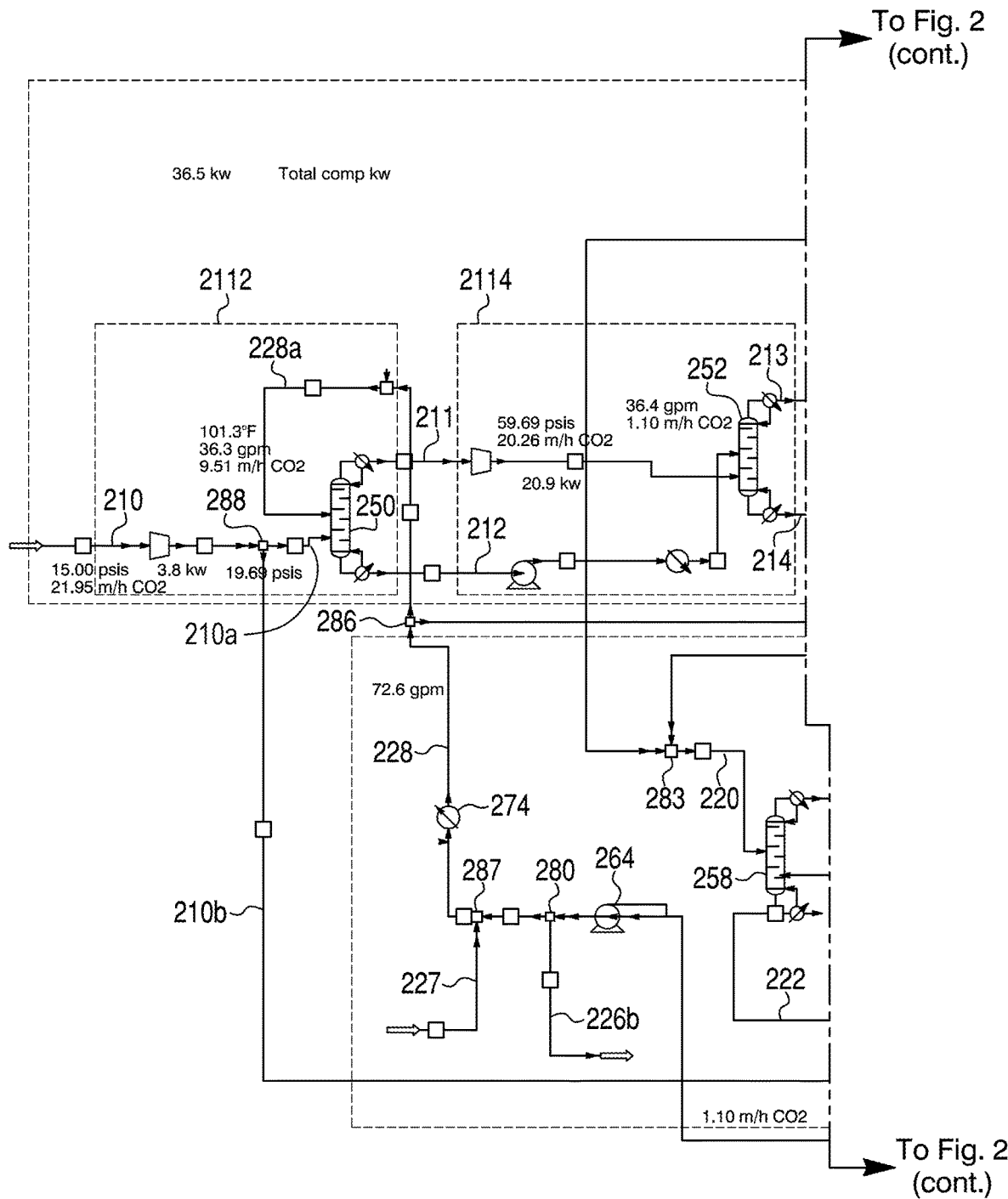
FIG. 2 shows a schematic view of a carbon dioxide removal system for a fuel cell, according to a second embodiment of the present invention, where the rich Selexol™ is stripped with air and $O_2$ is stripped from the lean Selexol™ with a portion of the anode exhaust stream.
Figure 2:
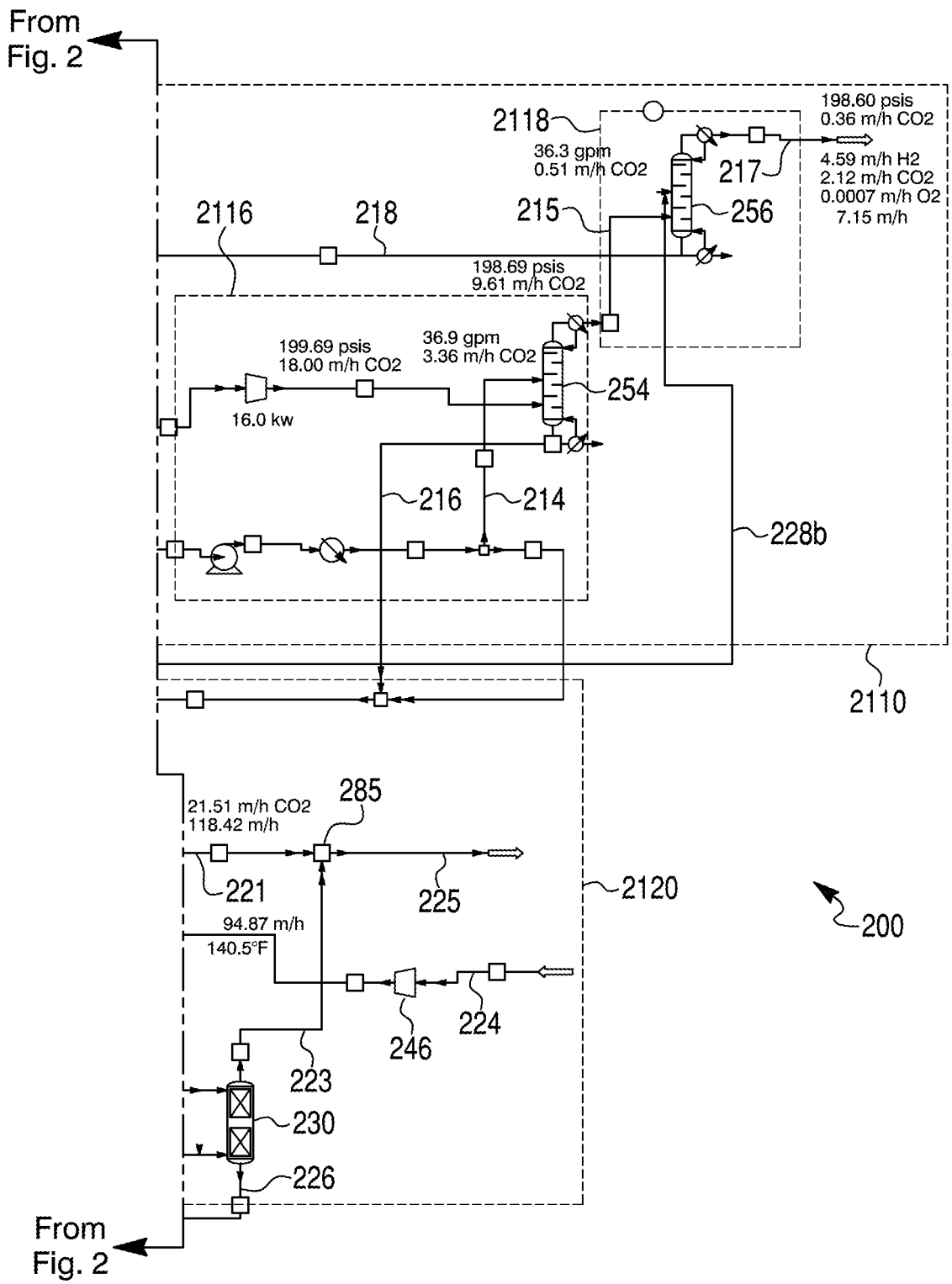

For example, FIG. 2 schematically shows a system 200 for removing carbon dioxide from an anode exhaust stream produced by a fuel cell according to a second embodiment of the present invention. Like the first embodiment, the system 200 comprises an absorption system 2110 and a regeneration system 2120. Like the absorption system 110 of the first embodiment, the absorption system 2110 of the second embodiment includes four absorption stages 2112, 2114, 2116, 2118, which operate in a similar manner as the absorption stages of the first embodiment. The first three stages 2112, 2114, 2116 gradually increase the pressure of the exhaust streams 210, 211, 213 over the stages while also subjecting the exhaust streams to absorption processes using absorber towers 250, 252, 254. Also like the first embodiment, the fourth absorption stage 2118 receives the fully pressurized exhaust stream 215 and a lean solvent stream 228b into the fourth tower 256 to produce an output exhaust stream 217 suitable for syngas export.

As shown in FIG. 2, the regeneration system 2120 differs from the regeneration system 120 of the first embodiment in that a fifth tower 258 (a first regeneration tower), which is configured to air-strip the solvent stream of the carbon dioxide absorbed during the absorption stages, and a sixth tower 230 (a second regeneration tower), which is configured to strip the oxygen and nitrogen from the solvent stream using a portion of the anode exhaust gas diverted from the anode exhaust stream 210, are added to the regeneration system 2120.

As shown in FIG. 2, a first input solvent stream 216, produced from the absorption process in the third tower 254, and a second input solvent stream 218, produced from the absorption process in the fourth tower 256 are introduced into the regeneration system 2120 and mixed in a first mixer 283 into a mixed solvent stream 220, which is introduced into the fifth tower 258. Also introduced into the fifth tower 258 is an air stream 224 that has been pressurized using a fourth compressor/blower 246. The air stream 224 may be an air stream that will later be conveyed to the cathode of the fuel cell. When the fuel cell is an MCFC, it is preferably that most of all of the $CO_2$ be recycled to the fuel cell cathode for proper operation. The fifth tower 258 is configured to strip the mixed solvent stream 220 to produce a first output gas stream 221 comprising mainly nitrogen, oxygen, carbon dioxide, and small amounts of water, carbon monoxide, and hydrogen. The mixed solvent stream 220 exits the fifth tower 258 as a first lean solvent stream 222. The first lean solvent stream 222 contains small amounts of nitrogen and oxygen.

The first lean solvent stream 222 is then introduced into the sixth tower 230. As shown in FIG. 2, also added is a small first portion 210b (e.g., 5% of the flow) of the first anode exhaust stream 210, which is diverted from the first anode exhaust stream 210 through a first divider 288 while the remaining second portion 210a of the first anode exhaust stream 210 is conveyed to the first tower 250.

In the sixth tower 230, the resulting second output gas stream 223, comprising hydrogen, carbon monoxide, and almost all of the oxygen and nitrogen that was absorbed by the solvent in the air stripper 258, is mixed into the first output gas stream 221 using a second mixer 285, which produces a third output gas stream 225, comprising hydrogen, carbon monoxide, carbon dioxide, water, and small amounts of oxygen and nitrogen. The resulting third output gas stream 225 may be exported and inputted as feed into an anode gas oxidizer (AGO) or the cathode of the fuel cell.

The first lean solvent stream 222 exits the sixth tower 230 as a second lean solvent stream 226 that is now stripped of the nitrogen and oxygen contained in the first lean solvent stream 222. In addition, during the stripping process in the sixth tower 230, the second lean solvent stream 226 absorbs a small amount of carbon dioxide due to its exposure to the first portion 210b of the first anode exhaust stream 210. By stripping the solvent stream of nitrogen and oxygen, the resulting output exhaust stream 217 after it is exposed to the output lean solvent stream 228b will contain less oxygen, which may be preferable in certain downstream processes utilizing the exported syngas.

To maintain the proper volume of solvent in the system, the lean solvent stream 226 may be pressurized with a third pump 264 and a portion 226b of the lean solvent stream 226 may be removed from the system 200 using a second divider 280 to prevent excess solvent in the system. A makeup solvent stream 227 may likewise be introduced into the lean solvent stream 226 using a second mixer 287 to produce an output solvent stream 228 to prevent insufficient solvent inventory. The output solvent stream 228 is then cooled by a heat exchanger 274 and split by a third divider 286 into a first solvent stream 228a, which is introduced into the first tower 250, and an output lean solvent stream 228b, which is introduced into the fourth tower 256.

The regeneration system 2120 of the second embodiment allows for the production of an ultra-lean solvent stream compared to the regeneration system 120 of the first embodiment (e.g., the output solvent stream 228 may contain Selexol™ in a proportion of about 99 mol % compared to the output solvent stream 24, which may contain Selexol™ in a proportion of about 90 mol %). The ultra-lean solvent stream allows for greater $CO_2$ absorption (e.g., reducing the proportion of $CO_2$ in the output exhaust stream 217 to about 5 mol %), resulting in higher concentrations of hydrogen (e.g., about 64 mol %) and carbon monoxide (e.g., about 30 mol %).

Third Embodiment

Figure 3:
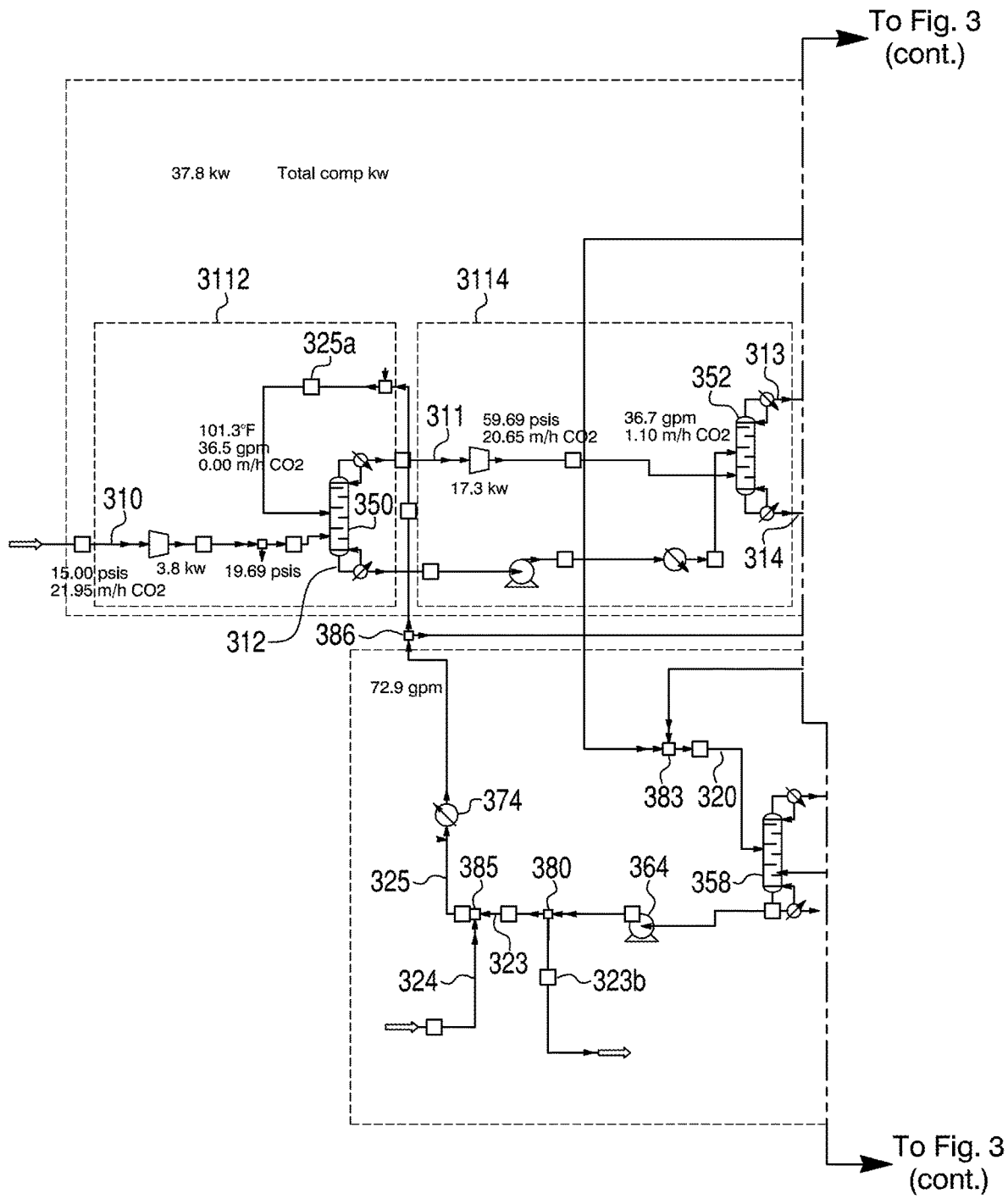
FIG. 3 shows a schematic view of a carbon dioxide removal system for a fuel cell, according to a third embodiment of the present invention, where the rich Selexol™ is stripped with air.
Figure 3:
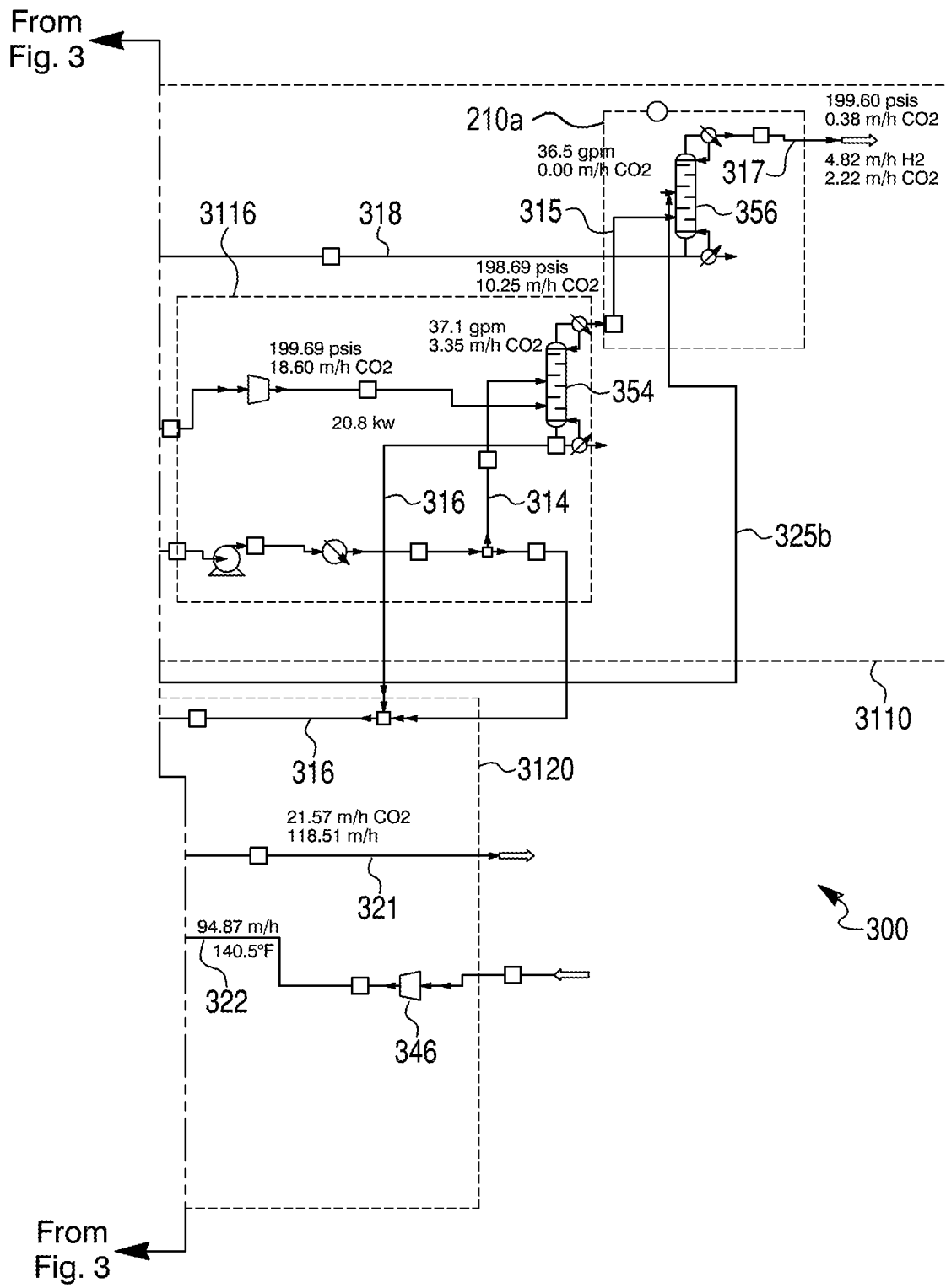

FIG. 3 schematically shows a system 300 for removing carbon dioxide from an anode exhaust stream produced by a fuel cell according to a third embodiment of the present invention. Like the first and second embodiments, the system 300 comprises an absorption system 3110 and a regeneration system 3120. Like the absorption systems of the first and second embodiments, the absorption system 3110 of the third embodiment includes four absorption stages 3112, 3114, 3116, 3118, which are configured to operate in substantially the same manner as the absorption stages of the first and second embodiments. The first three stages 3112, 3114, 3116 gradually increase the pressure of the exhaust streams 310, 311, 313 over the stages while also subjecting the exhaust streams to absorption processes using towers 350, 352, 354. Also like the first and second embodiments, the fourth absorption stage 3118 receives the fully pressurized exhaust stream 315 and an output lean solvent stream 325b into the fourth tower 356 to produce an output exhaust stream 317 suitable for syngas export.

As shown in FIG. 3, the regeneration system 3120 differs from the regeneration system 120 of the first embodiment in that a fifth tower 358 configured to air-strip the solvent stream of the carbon dioxide absorbed during the absorption stages is added to the regeneration system 3120. In this configuration, the regeneration system 3120 is similar to the regeneration system 2120 of the second embodiment except that the regeneration system 3120 does not contain a sixth tower to strip the solvent of oxygen and nitrogen.

As shown in FIG. 3, a first input solvent stream 316, produced from the absorption process in the third tower 354, and a second input solvent stream 318, produced from the absorption process in the fourth tower 356, are introduced into the regeneration system 3120 and mixed in a first mixer 383 to produce a mixed solvent stream 320, which is introduced into the fifth tower 358. Like the second embodiment, also introduced into the fifth tower 358 is an air stream 322 that has been pressurized using a fourth compressor 346.

The air stream 322 may be an air stream configured to be provided to a cathode of the fuel cell. The fifth tower 358 is configured to air-strip the mixed solvent stream 320 to produce an output gas stream 321 comprising mainly carbon dioxide, nitrogen, oxygen, with small amounts of water, carbon monoxide, and hydrogen. The output gas stream 321 may be exported and inputted as feed into an anode gas oxidizer (AGO) or the cathode of the fuel cell. The mixed solvent stream 320 exits the fifth direct contact absorption cooling tower 358 as a lean solvent stream 323. The lean solvent stream 323 contains small amounts of nitrogen and oxygen.

Like the first and second embodiments, the lean solvent stream 323 is pressurized by a third pump 364, and a portion 323b of the lean solvent stream 323 may be removed from the system 300 using a first divider 380 to prevent excess solvent in the system. A make-up solvent stream 324 may likewise be introduced into the lean solvent stream 323 using a second mixer 385 to produce an output solvent stream 325 to prevent insufficient solvent inventory.

The output solvent stream 325 is then cooled by a heat exchanger 374 and split in portions by a second divider 386 into a first solvent stream 325a, which is introduced into the first tower 350, and an output lean solvent stream 325b, which is introduced into the fourth tower 356.

Like the second embodiment, the regeneration system 3120 allows for the production of an ultra-lean solvent stream compared to the regeneration system 120 of the first embodiment (e.g., the output solvent stream 325 may contain Selexol™ in a proportion of about 99 mol % compared to the output solvent stream 24, which may contain Selexol™ in a proportion of about 90 mol %). The ultra-lean solvent stream allows for greater $CO_2$ absorption (e.g., reducing the proportion of $CO_2$ in the output exhaust stream 317 to about 5 mol %), resulting in higher concentrations of hydrogen (e.g., about 64 mol %) and carbon monoxide (e.g., about 30 mol %). In this case, a small amount of oxygen in the lean solvent 325 due to air stripping will be transferred to the syngas product 317 so that the product could have an oxygen content of about 0.8%. This may or may not be detrimental to down stream processes.

Fourth Embodiment

Figure 4:
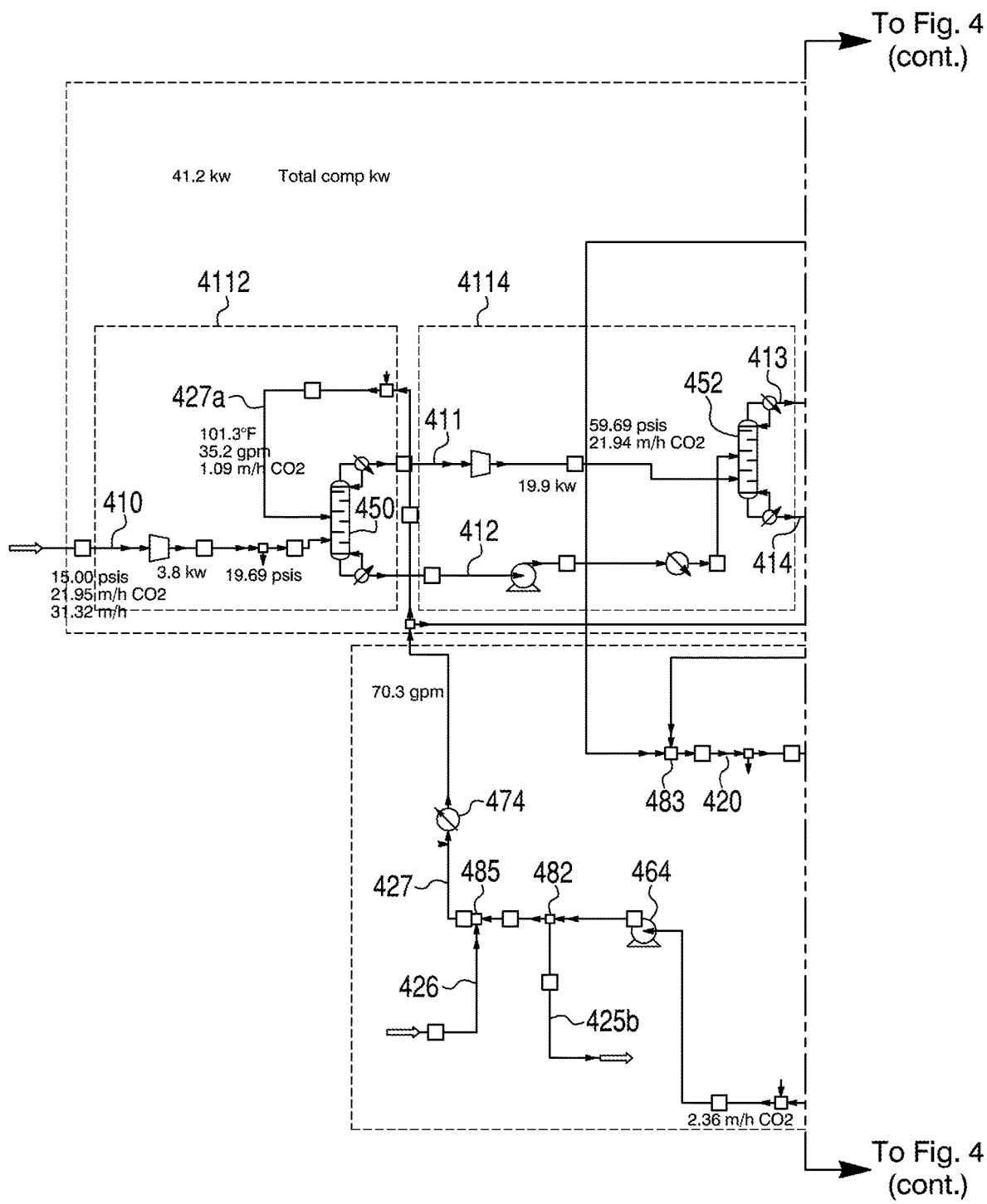
FIG. 4 shows a schematic view of a carbon dioxide removal system for a fuel cell, according to a fourth embodiment of the present invention, where the rich Selexol™ is flashed at a moderate pressure and then flashed at a low pressure.
Figure 4:
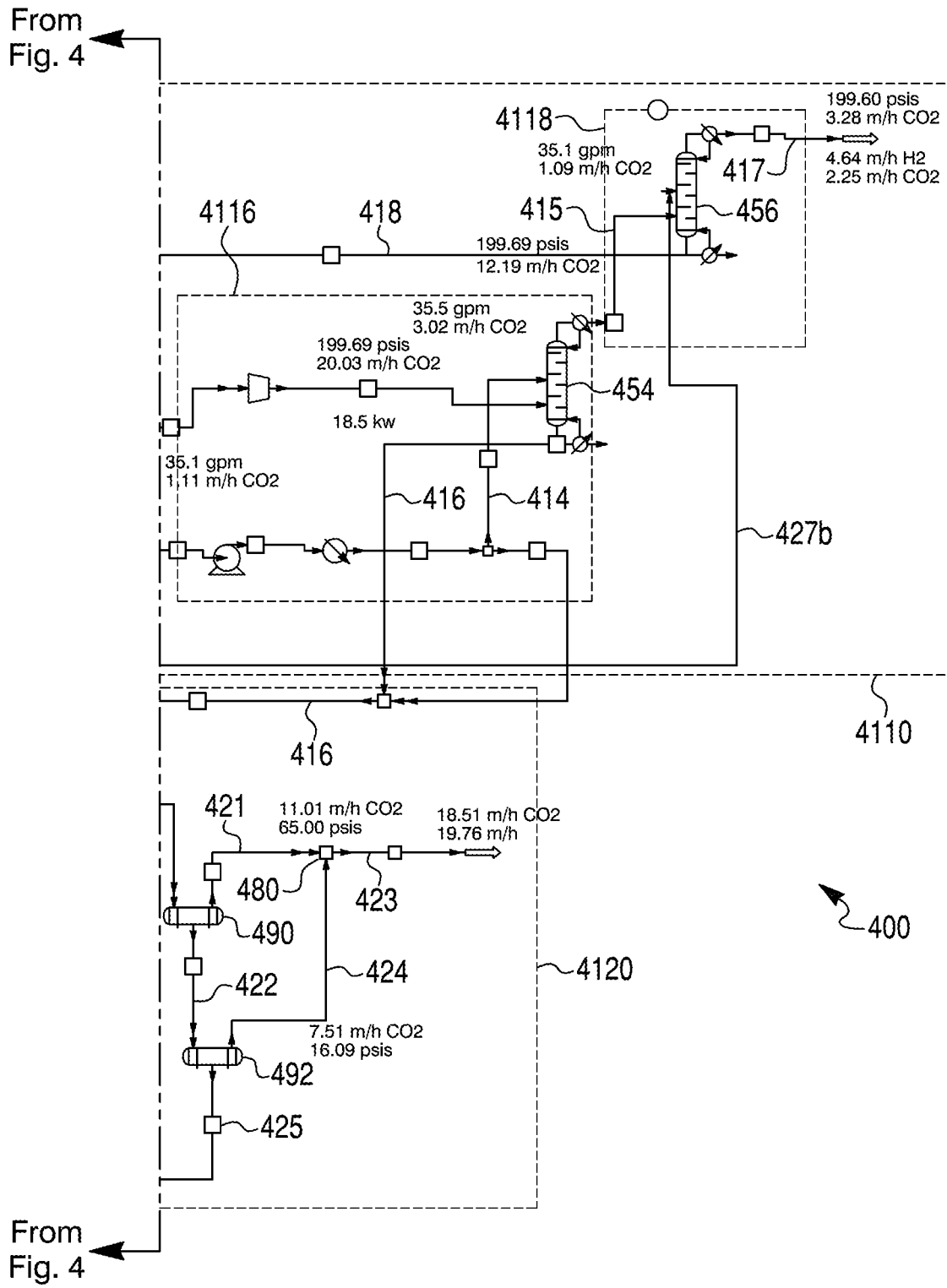

FIG. 4 schematically shows a system 400 for removing carbon dioxide from an anode exhaust stream produced by a fuel cell according to a fourth embodiment of the present invention. Like the first through third embodiments, the system 400 comprises an absorption system 4110 and a regeneration system 4120. Like the absorption systems of the first through third embodiments, the absorption system 4110 of the fourth embodiment includes four absorption stages 4112, 4114, 4116, 4118, which are configured to operate in substantially the same manner as the absorption stages of the first, second and third embodiments. The first three stages 4112, 4114, 4116 gradually increase the pressure of the exhaust streams 410, 411, 413 over the stages while also subjecting the exhaust streams to absorption processes using towers 450, 452, 454. Also like the first through third embodiments, the fourth absorption stage 4118 receives the fully pressurized exhaust stream 415 and an output lean solvent stream 427b into the fourth tower 456 to produce an output exhaust stream 417 suitable for syngas export.

The regeneration system 4120 is similar to the regeneration system 120 of the first embodiment except a second flash tank 492 is added. As shown in FIG. 4, the mixed solvent stream 420 is introduced into a first flash tank 490.

The first flash tank 490 is configured receive the mixed solvent stream 420 and produce a flash steam in the form of a first high-purity $CO_2$ stream 421 (e.g., a stream having carbon dioxide in a proportion of at least 95 mol %) at a moderate pressure.

A first lean solvent stream 422 exits the first flash tank 490 and is then introduced into a second flash tank 492. Like the first flash tank 490, the second flash tank 492 is configured to receive the first lean solvent stream 422 and produce a flash stream in the form of a second high-purity $CO_2$ stream 424 (e.g., a stream having carbon dioxide in a proportion of at least 92 mol %). The second high-purity $CO_2$ stream 424 is conveyed to a second mixer 480 to be mixed with the first high-purity $CO_2$ stream 421 to produce an output $CO_2$ stream 423 suitable for export for other purposes. If a moderate pressure $CO_2$ stream is desired, the low pressure $CO_2$ stream 424 may be compressed before mixing with the moderate pressure $CO_2$ stream 421 so that the export $CO_2$ stream is at moderate pressure. Alternately, if a moderate pressure $CO_2$ stream is desired, the low pressure $CO_2$ stream 424 may be vented or sent back to the fuel cell or anode gas oxidizer.

As shown in FIG. 4, the first lean solvent stream 422 exits the flash tank 492 as a second lean solvent stream 425, which, similar to the first through third embodiments, is pumped back up to a higher pressure and may be mixed with a small amount of make-up solvent 426 using a second mixer 485, or some amount of solvent 425b may be removed using a first divider 482, to produce an output solvent stream 427. After being cooled by a heat exchanger 474, the output solvent stream 427 is split by a second divider 486 into a first solvent stream 427a, which is introduced into the first tower 450, and an output lean solvent stream 427b, which is introduced into the fourth tower 456.

By adding a second flash tank 492 to the regeneration system of 4120, a greater amount of carbon dioxide absorbed by the solvent stream during the absorption processes may be removed from the lean solvent streams to provide a leaner solvent stream (e.g., Selexol™ present in a proportion of at least 95 mol %). The leaner solvent stream allows for greater $CO_2$ absorption (e.g., reducing the proportion of $CO_2$ in the output exhaust stream 417 to about 30 mol %), resulting in higher concentrations of hydrogen (e.g., about 44 mol %) and carbon monoxide (e.g., about 20 mol %).

Fifth Embodiment

Figure 5:
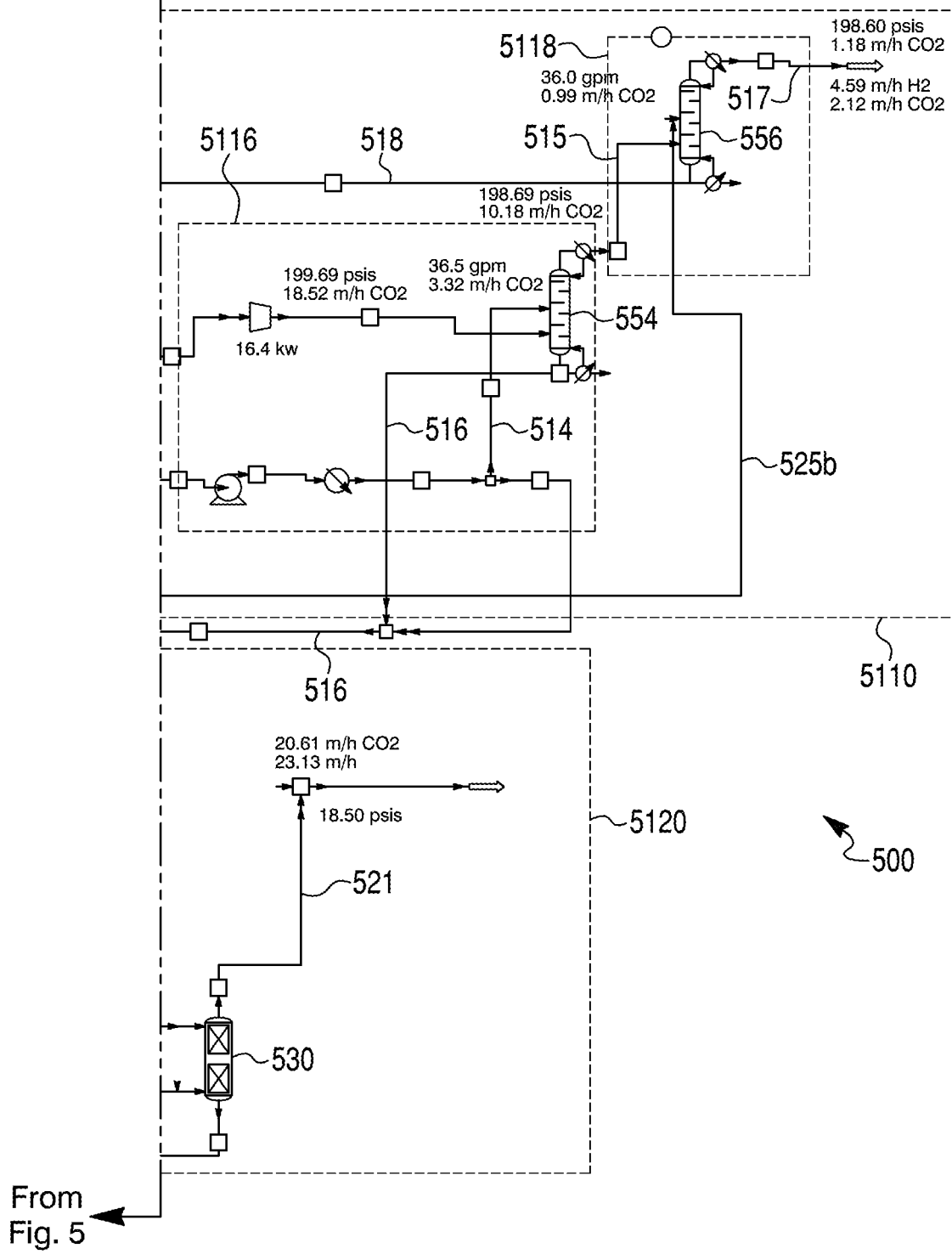
FIG. 5 shows a schematic view of a carbon dioxide removal system for a fuel cell, according to a fifth embodiment of the present invention, where the rich Selexol™ is stripped with a portion of the anode exhaust stream.

FIG. 5 schematically shows a system 500 for removing carbon dioxide from an anode exhaust stream produced by a fuel cell according to a fifth embodiment of the present invention. Like the first through fourth embodiments, the system 500 comprises an absorption system 5110 and a regeneration system 5120. Like the absorption systems of the first through fourth embodiments, the absorption system 5110 of the fifth embodiment includes four absorption stages 5112, 5114, 5116, 5118, which are configured to operate in substantially the same manner as the absorption stages of the previous embodiments. The first three stages 5112, 5114, 5116 gradually increase the pressure of the exhaust streams 510, 511, 513 over the stages while also subjecting the exhaust streams to absorption processes using towers 550, 552, 554. Also like the first through fourth embodiments, the fourth absorption stage 5118 receives the fully pressurized exhaust stream 515 and an output lean solvent stream 525b into the fourth tower 556 to produce an output exhaust stream 517 suitable for syngas export.

As shown in FIG. 5, the regeneration system 5120 is substantially the same as the regeneration system 2120 of the second embodiment except that a tower configured to air-strip the mixed solvent stream is removed from the regeneration system. Instead, as shown in FIG. 5, the rich solvent stream 520 is introduced into a fifth tower 530 that is configured to strip the rich solvent stream 520 at low pressure using gas diverted from the anode exhaust stream 510.

Like the second embodiment, a small first portion 510b (e.g., 5% of the flow) of the first anode exhaust stream 510, which is diverted from the first anode exhaust stream 510 through a first divider 588, is added to the fifth tower 530, while the remaining second portion 510a of the first anode exhaust stream 510 is conveyed to the first tower 550.

In the fifth tower 530, the resulting output gas stream 521, comprising hydrogen, carbon monoxide, carbon dioxide, water, and nitrogen is exported and may be inputted as feed into an anode gas oxidizer (AGO) or a cathode of a fuel cell. The mixed solvent stream 520 exits the fifth tower 530 as a lean solvent stream 522 that is now substantially stripped of the hydrogen, carbon monoxide, carbon dioxide, water, and nitrogen contained in the mixed solvent stream 520.

Like the first through fourth embodiments, the lean solvent stream 522 is pressurized by a third pump 564. A small portion 522b of lean solvent may be removed from the lean solvent stream 522 at a second divider 580, or a make-up solvent stream 524 may be added to the lean solvent stream 522 using a third mixer 585 to produce an output solvent stream 525. The output solvent stream 525 is then cooled by a heat exchanger 574 and split in equal portions by a third divider 586 into a first solvent stream 525a, which is introduced into the first tower 550, and an output lean solvent stream 525b, which is introduced into the fourth tower 556.

The regeneration system 5120 allows for the production of an ultra-lean solvent stream compared to the regeneration system 120 of the first embodiment (e.g., the output solvent stream 525 may contain Selexol™ in a proportion of about 98 mol % compared to the output solvent stream 24, which may contain Selexol™ in a proportion of about 90 mol %). The ultra-lean solvent stream allows for greater $CO_2$ absorption (e.g., reducing the proportion of $CO_2$ in the output exhaust stream 517 to about 15 mol %), resulting in higher concentrations of hydrogen (e.g., about 57 mol %) and carbon monoxide (e.g., about 26 mol %).

ALTERNATIVE CONFIGURATIONS

While the above embodiments were described as utilizing the physical solvent Selexol™, other types of physical solvents may be used. For example, physical solvents used in Benfield processes may be used as a solvent in the systems described above.

A refrigeration system may be added to the systems described above in order to cool the Selexol™ to a lower temperature before it is exposed to the exhaust stream during the absorption processes. At lower temperatures, the Selexol™ may absorb more $CO_2$ present in the exhaust stream and, by lowering temperature of the exhaust stream during the absorption process, will further reduce the power needed to compress the exhaust stream to sufficiently high pressures.

Figure 6:
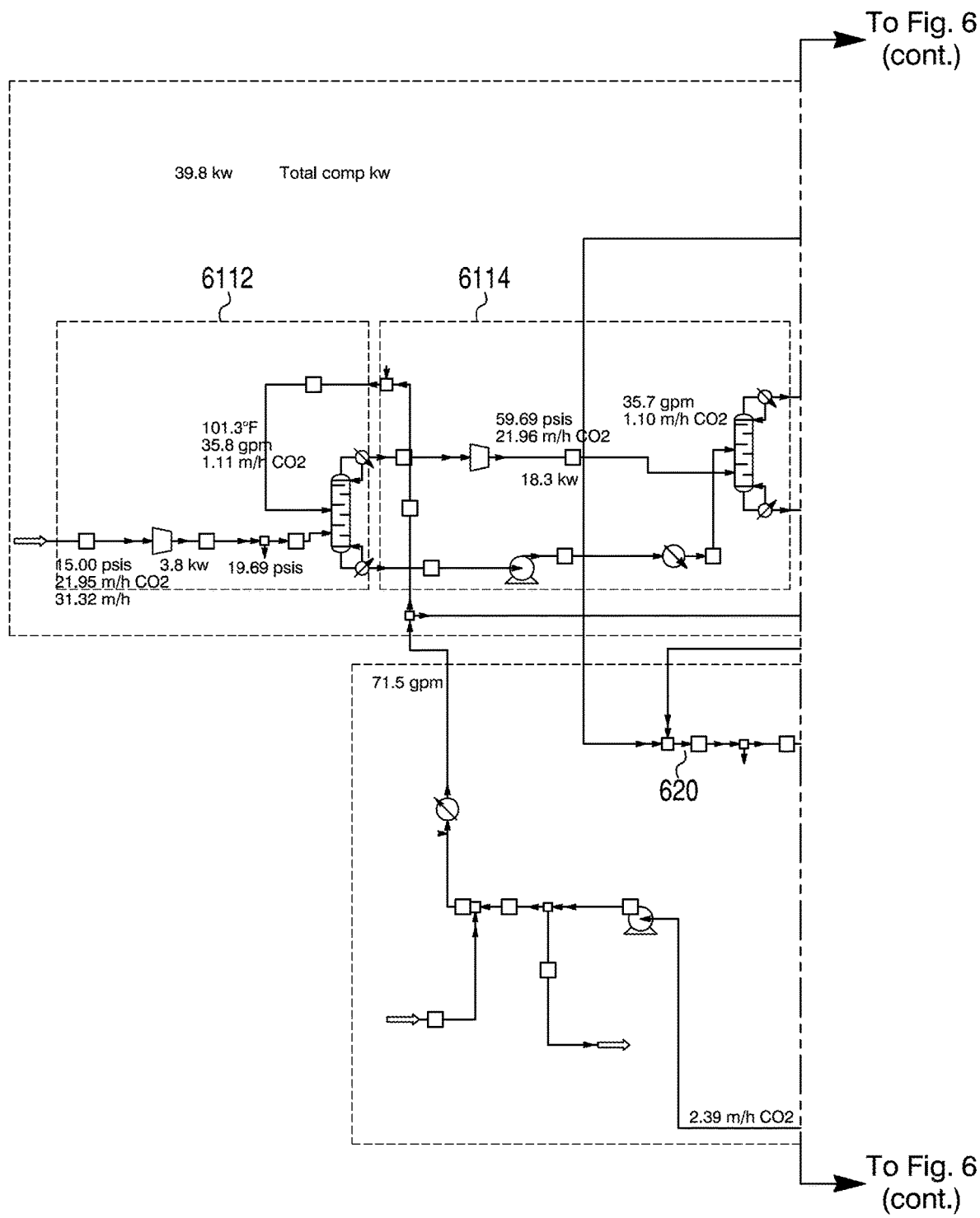
FIG. 6 shows a schematic view of a carbon dioxide removal system for a fuel cell, according to a sixth embodiment of the present invention, where the rich Selexol™ is flashed at a low pressure.
Figure 6:
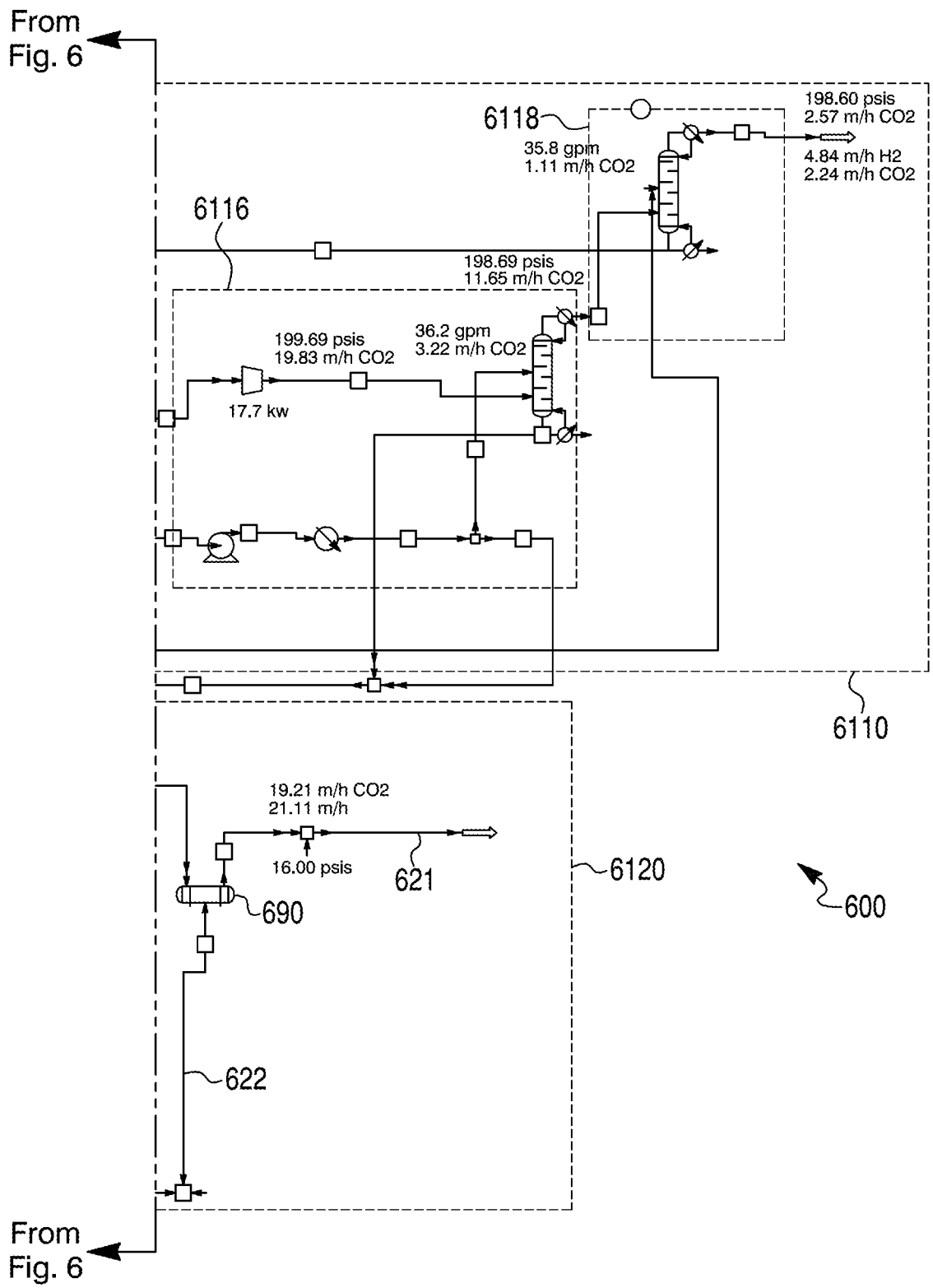

FIG. 6 schematically shows a system 600 for removing carbon dioxide from an anode exhaust stream produced by a fuel cell according to a sixth embodiment of the present invention. The system 600 is substantially the same as the system 100 shown in FIG. 4 except the intermediate pressure flash tank is eliminated and no intermediate pressure CO2 stream is generated. Specifically, the regeneration process in the regeneration system 6120 includes a flash tank 690 that provides a flash treatment to the $CO_2$-rich Selexol™ (the mixed input solvent stream 620) in order to produce a highly pure $CO_2$ stream 621. In this configuration, however, the mixed input solvent stream 620 is flash treated at low pressure (e.g., about 16 psia) as opposed to an intermediate pressure that was applied in FIG. 4 (e.g., about 65 psia). This allows for similar extraction of the $CO_2$ absorbed in the Selexol™, thus producing a more lean Selexol™ in the lean solvent stream 622 (e.g., about 97 mol %) than in the first embodiment.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A carbon dioxide removal system comprising:
an absorption system comprising a plurality of absorption stages, the plurality of absorption stages including a first absorption stage and a second absorption stage;
wherein the first absorption stage comprises:
a first compressor configured to receive a first carbon dioxide-containing exhaust stream from an anode of a fuel cell and to compress the first exhaust stream, and
a first direct contact absorption cooling tower configured to absorb carbon dioxide from the compressed first exhaust stream, to lower a temperature of the compressed first exhaust stream using a first solvent stream containing a physical solvent, and to generate a second exhaust stream; and
wherein the second absorption stage comprises:
a second compressor configured to receive the second exhaust stream from the first absorption stage and to compress the second exhaust stream, and
a second direct contact absorption cooling tower configured to absorb carbon dioxide from the compressed second exhaust stream, to lower a temperature of the compressed second exhaust stream using a second solvent stream containing a physical solvent, and to generate a third exhaust stream.

2. The carbon dioxide removal system of claim 1, further comprising a regeneration system configured to receive at least one solvent stream from at least one of the plurality of absorption stages and to output a lean solvent stream.

3. The carbon dioxide removal system of claim 2, wherein the regeneration system is further configured to output a high-purity CO2 stream.

4. The carbon dioxide removal system of claim 2, wherein the regeneration system comprises a first flash tank configured to perform a flash treatment on the at least one solvent stream from said at least one of the plurality absorption stages and to generate a first lean solvent stream.

5. The carbon dioxide removal system of claim 4, wherein the regeneration system further comprises a second flash tank configured to perform a flash treatment on the first lean solvent stream and to generate a second lean solvent stream.

6. The carbon dioxide removal system of claim 2, wherein the first solvent stream is at least a portion of the lean solvent stream output by the regeneration system.

7. The carbon dioxide removal system of claim 1, wherein:
the absorption system further comprises:
a first pump configured to raise a pressure of a first solvent output stream received from the first direct contact absorption cooling tower, and
a first heat exchanger configured to cool the pressurized first solvent output stream and to output the second exhaust stream to the second direct contact absorption cooling tower.

8. The carbon dioxide removal system of claim 1, wherein:
the plurality of absorption stages further comprise a third absorption stage, and
the third absorption stage comprises:
a third compressor configured to receive the third exhaust stream from the second absorption stage, and to compress the third exhaust stream, and
a third direct contact absorption cooling tower configured to absorb carbon dioxide from the compressed third exhaust stream, to lower a temperature of the compressed third exhaust stream using a third solvent stream containing a physical solvent, and to generate a fourth exhaust stream; and
the absorption system further comprises:
a second pump configured to raise a pressure of a second solvent output stream received from the second direct contact absorption cooling tower, and
a second heat exchanger configured to cool the pressurized second solvent output stream and to output the third exhaust stream to the third direct contact absorption cooling tower.

9. The carbon dioxide removal system of claim 8, wherein:
the plurality of absorption stages further comprise a fourth absorption stage;
the fourth absorption stage comprises a fourth direct contact absorption cooling tower configured to receive the fourth exhaust stream from the third absorption stage, to absorb carbon dioxide from the fourth exhaust stream and to lower a temperature of the fourth exhaust stream using a fourth solvent stream containing a physical solvent;
the carbon dioxide removal system further comprises a regeneration system configured to receive a first input solvent stream from the third absorption stage and a second input solvent stream from the fourth absorption stage, and to output a lean solvent stream; and
each of the first and fourth solvent streams is a portion of the lean solvent stream output by the regeneration system.

10. The carbon dioxide removal system of claim 9, wherein the regeneration system is further configured to output a high-purity CO2 stream.

11. The carbon dioxide removal system of claim 1, wherein:
   the plurality of absorption stages comprise a final absorption stage; and
   the final absorption stage comprises:
      a compressor configured to receive an exhaust stream from a previous absorption stage and to compress that exhaust stream, and
      an direct contact absorption cooling tower configured to absorb carbon dioxide from that compressed exhaust stream and to lower a temperature of that compressed exhaust stream using a solvent stream containing a physical solvent;
   the carbon dioxide removal system further comprises a regeneration system configured to receive at least one solvent stream from at least one of the absorption stages and to output a lean solvent stream; and
   the solvent stream used in the direct contact absorption cooling tower of the final absorption stage is a portion of the lean solvent stream output by the regeneration system.

12. The carbon dioxide removal system of claim 11, wherein the regeneration system is further configured to output a high-purity $CO_2$ stream.

13. The carbon dioxide removal system of claim 1, further comprising:
   a regeneration system comprising a first regeneration tower configured to receive at least one solvent stream from at least one of the plurality of absorption stages and to output a first lean solvent stream.

14. The carbon dioxide removal system of claim 13, wherein the regeneration system further comprises a second regeneration tower configured to remove oxygen and nitrogen from the first lean solvent stream using a portion of the first exhaust stream from the anode of the fuel cell, and to output a second lean solvent stream.

15. The carbon dioxide removal system of claim 1, further comprising:
   a regeneration system comprising a regeneration tower configured to remove oxygen and nitrogen from a first lean solvent stream using a portion of the first exhaust stream from the anode of the fuel cell, and to output a second lean solvent stream.

16. The carbon dioxide removal system of claim 1, further comprising:
   the fuel cell comprising the anode;
   wherein the fuel cell is a molten carbonate fuel cell.

17. The carbon dioxide removal system of claim 1, wherein the physical solvent is a polyethylene glycol dimethyl ether (PGDE) based solvent.

18. The carbon dioxide removal system of claim 17, wherein the PGDE based solvent is Selexol™.

* * * * *